(12) United States Patent
Jeon et al.

(10) Patent No.: US 7,787,429 B2
(45) Date of Patent: Aug. 31, 2010

(54) METHOD AND APPARATUS FOR ESTABLISHING PATH IN WIRELESS NETWORK

(75) Inventors: Paul Barom Jeon, Yongin-si (KR); Jun Hyeong Kim, Anyang-si (KR); Sang Do Park, Seoul (KR); Chul Hee Kang, Seoul (KR); Sun Shin An, Seoul (KR); Won Keun Kong, Suwon-si (KR); Joo Sang Youn, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 314 days.

(21) Appl. No.: 11/822,797

(22) Filed: Jul. 10, 2007

(65) Prior Publication Data

US 2008/0186869 A1  Aug. 7, 2008

(30) Foreign Application Priority Data

Feb. 7, 2007  (KR)  ............... 10-2007-0012900

(51) Int. Cl.
*H04W 4/00* (2009.01)
(52) U.S. Cl. .................................. 370/338; 370/331
(58) Field of Classification Search ................ 370/351, 370/389, 328, 338, 345, 445, 255, 331, 329
See application file for complete search history.

(56) References Cited

U.S. PATENT DOCUMENTS

| | | | |
|---|---|---|---|
| 6,744,740 B2 * | 6/2004 | Chen | 370/255 |
| 7,002,936 B2 * | 2/2006 | Agrawal et al. | 370/329 |
| 7,420,954 B2 * | 9/2008 | Elbatt et al. | 370/338 |
| 7,463,612 B2 * | 12/2008 | Fonseca et al. | 370/338 |
| 2005/0078672 A1 * | 4/2005 | Caliskan et al. | 370/389 |
| 2005/0083964 A1 | 4/2005 | Tatman et al. | |
| 2005/0094620 A1 * | 5/2005 | Calcev | 370/351 |
| 2005/0190717 A1 * | 9/2005 | Shu et al. | 370/328 |
| 2006/0109859 A1 * | 5/2006 | Acharya et al. | 370/445 |
| 2006/0227744 A1 * | 10/2006 | Metke et al. | 370/331 |
| 2008/0101325 A1 * | 5/2008 | Bao et al. | 370/345 |

FOREIGN PATENT DOCUMENTS

| | | |
|---|---|---|
| KR | 10-2006-0006583 A | 1/2006 |
| KR | 10-2006-0020886 A | 3/2006 |
| KR | 10-2006-0074680 A | 7/2006 |

* cited by examiner

*Primary Examiner*—Kwang B Yao
*Assistant Examiner*—Syed Bokhari
(74) *Attorney, Agent, or Firm*—NSIP Law

(57) ABSTRACT

A method and apparatus for establishing a path in a wireless network are provided where the method includes receiving location information about a first neighbor node and a second neighbor node, the first neighbor node being located within a range of a first hop from a source node, the second neighbor node being located within a range of a second hop from the source node, determining a direction of a point where the second neighbor node is located, based on the source node, by using the received location information; detecting a particular second neighbor node having a same direction of a point where a destination node is located, based on the source node, and limitedly establishing a path via the detected second neighbor node, when the source node establishes a path for transmitting predetermined data to the destination node.

12 Claims, 23 Drawing Sheets

FIG. 2

| NODE ID | |
|---|---|
| NEIGHBOR NODE ID | ... |
| NEIGHBOR NODE POSITION | ... |
| NEIGHBOR NODE COVERAGE | ... |
| TIMESTAMP | ... |
| POSITION | |
| COVERAGE | |
| TIMESTAMP | |

FIG. 3B

| NEXT ZONE | NEXT NODE ID | POSITION |
|---|---|---|
| NODE 2 AREA | 2 | $(x,y)_2$ |
| NODE 3 AREA | 3 | $(x,y)_3$ |
| NODE 4 AREA | 4 | $(x,y)_4$ |

< NEIGHBOR NODE TABLE AT NODE 1 >

FIG. 3C

| NEXT ZONE | NEXT NODE ID | POSITION |
|---|---|---|
| NODE 1 AREA | 1 | $(x,y)_1$ |
| NODE 2 AREA | 2 | $(x,y)_2$ |
| NODE 6 AREA | 6 | $(x,y)_6$ |

< NEIGHBOR NODE TABLE AT NODE 3 >

FIG. 4B

| NODE 2 ||
|---|---|
| NODE 5 (NODE ID) | ... |
| NODE 5'S POSITION | ... |
| NODE 5'S ZONE | ... |
| TIMESTAMP | ... |
| NODE 2'S POSITION ||
| NODE 2'S ZONE ||
| TIMESTAMP ||

FIG. 4C

| FORWARDING ZONE | DIRECTION | NEXT NODE ID |
|---|---|---|
| NODE 5 AREA | | 2 |
| NODE 7 AREA | | 4 |
| NODE 6 AREA | | 3 |
| | | |

FIG. 7B

| NEXT ZONE | NODE ID | POSITION |
|---|---|---|
| NODE 1 AREA | 1 | $(x,y)_1$ |
| NODE 4 AREA | 4 | $(x,y)_4$ |
| NOZONE | 3 | $(x,y)_5$ |

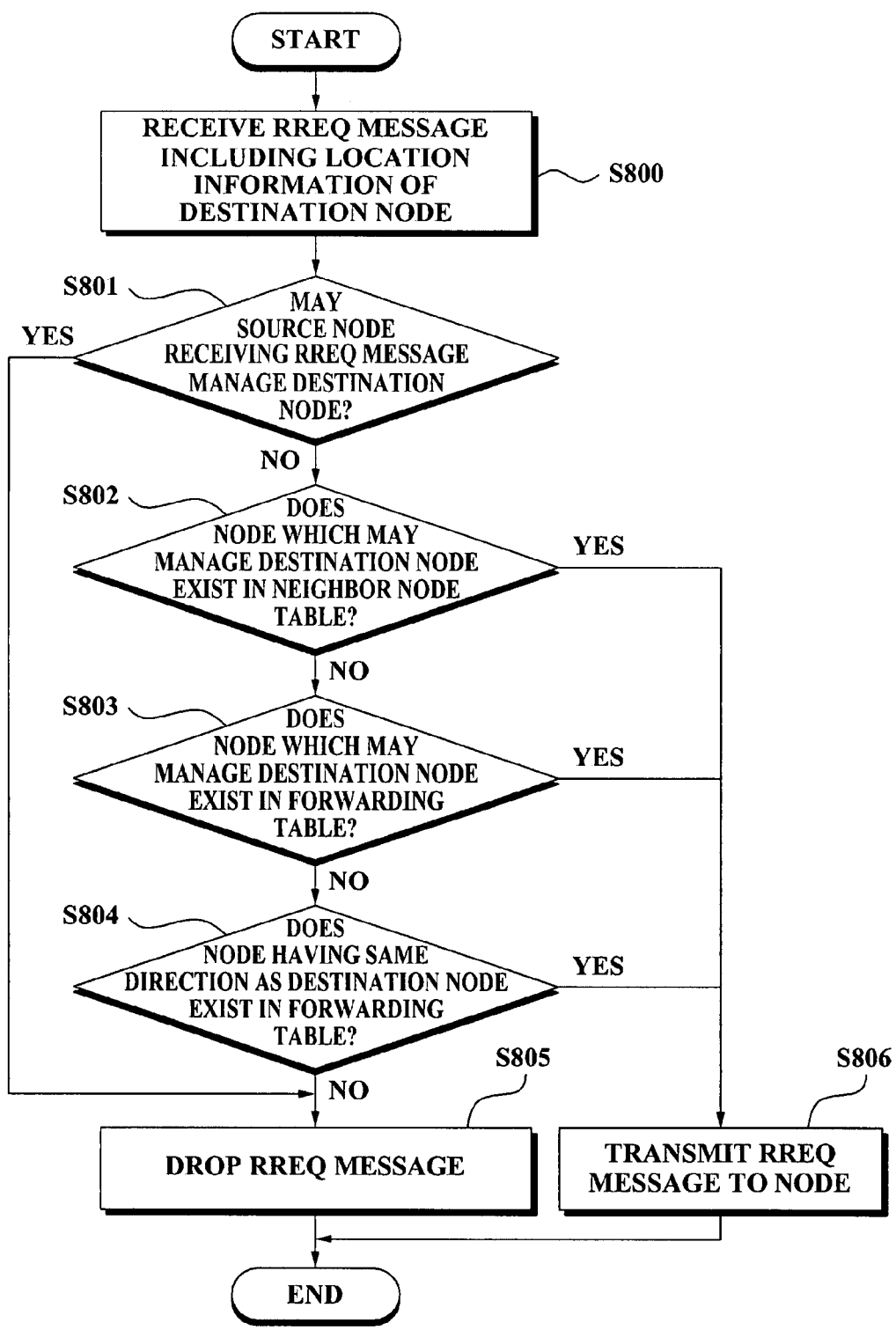

FIG. 9B

| FORWARDING ZONE | DIRECTION | NEXT NODE ID |
|---|---|---|
| NODE 5 AREA | 2 | 2 |
| NODE 6 AREA | 2 | 3 |
| NODE 8 AREA | 1 | 4 |
|  |  |  |

METHOD AND APPARATUS FOR ESTABLISHING PATH IN WIRELESS NETWORK

CROSS-REFERENCE TO RELATED APPLICATIONS

This application claims benefit under 35 U.S.C. §119(a) of a Korean Patent Application No. 10-2007-0012900, filed on Feb. 7, 2007, in the Korean Intellectual Property Office, the entire disclosure of which is hereby incorporated by reference.

BACKGROUND OF THE INVENTION

1. Field of the Invention

The present invention relates to a wireless network system. More particularly, the present invention relates to a method and apparatus for establishing a path in a wireless network.

2. Description of Related Art

In a conventional art, wired network systems are commonly used. Currently, home wireless networks and wireless networks covering wide areas are generally used due to various advantages and conveniences.

Specifically, as an example of such wireless networks, ad hoc networks are used. Such ad hoc networks refer to infrastructure-less networks and are autonomously comprised of nodes. Also, such ad hoc networks do not require network infrastructure devices such as base stations or access points for network configuration and maintenance. Also, nodes of ad hoc networks communicate with each other via wireless interfaces, and may freely move. Also, limits of communication distances of wireless interfaces may be overcome by multi-hop routing functions.

Also, in wireless networks such as ad hoc networks, source nodes transmit particular data via all nodes in wireless network environments by using a flooding method when discovering a path between a source and a destination according to routing protocols. The flooding method may refer to a communication method which transmits a single packet received from a random node to other all nodes accessed to routers.

However, position based routing methods and apparatuses in the conventional art have following disadvantages.

Position based routing methods and apparatuses in the conventional art randomly transmit data to almost all nodes during a route discovery procedure, which causes a decrease of packet transmission efficiency. Specifically, as an example, when a source node is very far away from a destination node, the possibility that a flooding may occur in the entire wireless networks is high. Also, when a density is high, severe route overhead may occur. Further, when a direction between a destination node and a source node is straight, request zones where a flooding may not occur are set, and thus a routing itself may not be performed.

Position based routing methods and apparatuses in the conventional art may not use nodes having no location information for communications in wireless network environments. Particularly, when a great number of nodes without location information exist, communications are unstable and efficiency may be deteriorated.

Accordingly, there is a need for a method and apparatus for establishing a path in a wireless network that overcome these disadvantages.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for establishing a path in a wireless network which may improve efficiency during a route discovery procedure by limitedly using a flooding method based on direction between a source and a destination according to a predetermined standard.

An aspect of exemplary embodiments of the present invention also provides a method and apparatus for establishing a path in a wireless network which may use location-less nodes having no location information during a route discovery process in a wireless network environment, when a great number of location-less nodes having no location information exist.

According to an aspect of exemplary embodiments of the present invention, a method of establishing a path in a wireless network is provided, the method including receiving location information about a first neighbor node and a second neighbor node, the first neighbor node being located within a range of a first hop from a source node, the second neighbor node being located within a range of a second hop from the source node, determining a direction of a point where the second neighbor node is located, based on the source node, by using the received location information, detecting a particular second neighbor node having a same direction of a point where a destination node is located, based on the source node, and limitedly establishing a path via the detected second neighbor node, when the source node establishes a path for transmitting predetermined data to the destination node.

According to another aspect of exemplary embodiments of the present invention, an apparatus for establishing a path in a wireless network is provided, the apparatus including a receiving unit for receiving location information about a first neighbor node and a second neighbor node, the first neighbor node being located within a range of a first hop from a source node, the second neighbor node being located within a range of a second hop from the source node, a determination unit for determining a direction of a point where the second neighbor node is located, based on the source node, by using the received location information, a detection unit for detecting a particular second neighbor node having a same direction of a point where a destination node is located, based on the source node, and an establishment unit for limitedly establishing a path via the detected second neighbor node, when the source node establishes a path for transmitting predetermined data to the destination node.

BRIEF DESCRIPTION OF THE DRAWINGS

The above and other objects, features, and advantages of certain exemplary embodiments of the present invention will be more apparent from the following detailed description, taken in conjunction with the accompanying drawings in which:

FIG. 2 is a diagram illustrating an example of a format of an update message broadcasted by a random node in a wireless network according to an exemplary embodiment of the present invention;

FIG. 3B is a diagram illustrating an example of a neighbor node table of node 1 in the wireless network environment illustrated in FIG. 3A;

FIG. 3C is a diagram illustrating an example of a neighbor node table of node 3 in the wireless network environment illustrated in FIG. 3A;

FIG. 4B is a diagram illustrating an example of a format of an update message broadcasted by node 2 in the wireless network environment illustrated in FIG. 4A;

FIG. 4C is a diagram illustrating an example of a forwarding table of node 1 in the wireless network environment illustrated in FIG. 4A;

FIG. 7B is a diagram illustrating an example of a neighbor node table of node 2 in the wireless network environment illustrated in FIG. 7A;

FIG. 8 is a flowchart illustrating an example of a method of controlling an apparatus for establishing a path in a wireless network according to an exemplary embodiment of the present invention;

FIG. 9B is a diagram illustrating an example of a forwarding table of node 1 in the wireless network environment of FIG. 9A;

Throughout the drawings, the same drawing reference numerals will be understood to refer to the same elements, features, and structures.

DETAILED DESCRIPTION OF EXEMPLARY EMBODIMENTS

The matters exemplified in the description such as a detailed construction and elements are provided to assist in a comprehensive understanding of the various embodiments of the present invention disclosed with reference to the accompanying figures. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
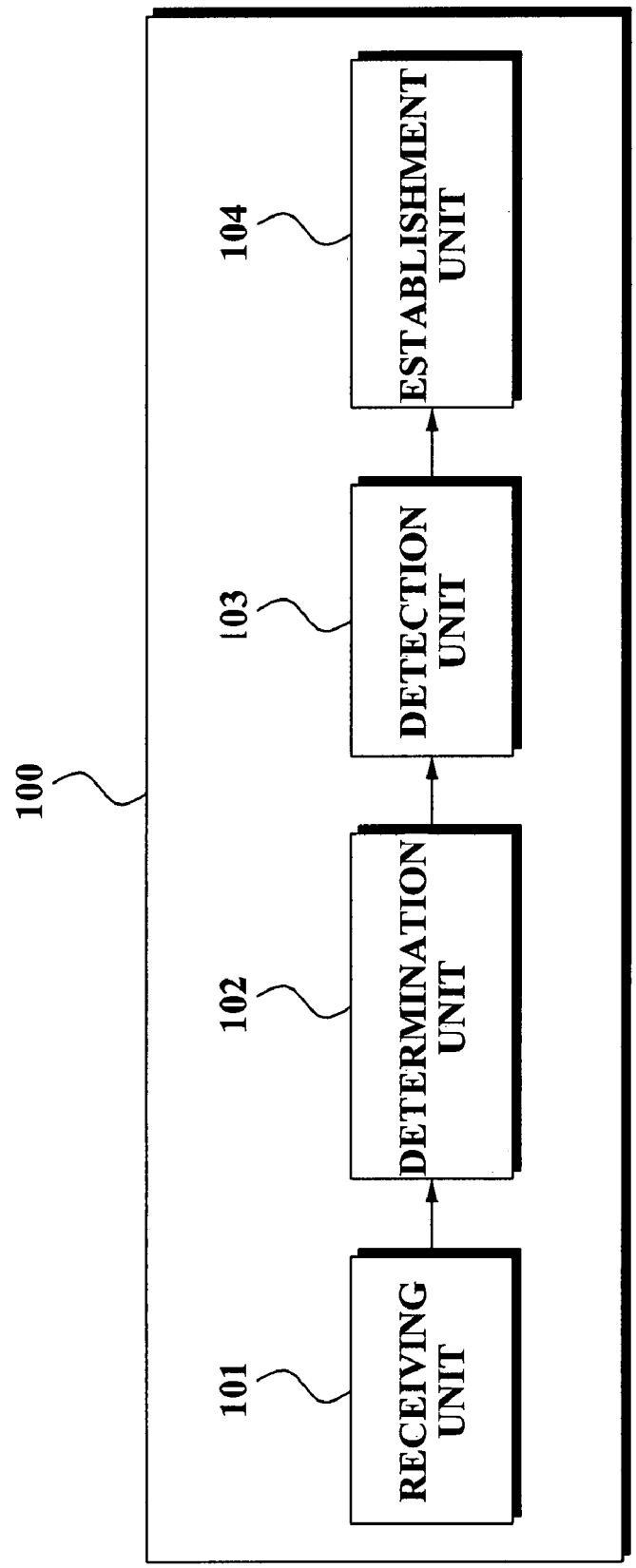
FIG. 1 is a block diagram illustrating an example of a configuration of an apparatus for establishing a path in a wireless network according to an exemplary embodiment of the present invention.

FIG. 1 is a block diagram illustrating an example of a configuration of an apparatus for establishing a path in a wireless network according to an exemplary embodiment of the present invention. Hereinafter, referring to FIG. 1, the apparatus for establishing a path in a wireless network according to an exemplary embodiment of the present invention is described.

The wireless network where the present invention is applied may be an ad hoc network, a Geographic Code based Ubiquitous Sensor Network (GGC-based USN) environment, and the like.

As illustrated in FIG. 1, the apparatus for establishing a path in a wireless network 100 includes a receiving unit 101, a determination unit 102, a detection unit 103, an establishment unit 104, and the like. However, although the apparatus for establishing a path in a wireless network is illustrated according to an exemplary embodiment of the present invention, the present invention may be easily understood by those skilled in the related art with reference to the present specification. Also, the apparatus for establishing a path in a wireless network 100 may be a source node of a wireless network, and more particularly, a portable terminal, a personal computer (PC), and the like, in a wireless network environment.

The receiving unit 101 receives location information about a first neighbor node and a second neighbor node. The first neighbor node is located within a range of a first hop from the source node, and the second neighbor node is located within a range of a second hop from the source node. The determination unit 102 determines a direction of a point where the second neighbor node is located, based on the source node, by using the received location information. The detection unit 103 detects a particular second neighbor node having a same direction of a point where a destination node is located, based on the source node, by referring to the determined direction. The establishment unit 104 limitedly establishes a path via the detected second neighbor node, when the source node establishes a path for transmitting predetermined data to the destination node.

For reference, the hop may refer to a path where a data packet moves from a router to another router in a packet exchange network. The first neighbor node within the range of the first hop may refer to a neighbor node existing in a transmission range of the source node. The second neighbor node may refer to a neighbor node which is located within a range of a first hop from the first neighbor node and does not exist in the transmission range of the source node.

The exemplary embodiments of the present invention may improve network efficiency by reducing an excessive route overhead which is required for a route discovery in the wireless network environment, for example, a position-based sensor network environment. For this, in an exemplary embodiment of the present invention, new two tables which may optimally use location information of each node are provided. The two tables may be a neighbor node table and a forwarding table. When based on a random node, for example, the random node being the source node, the neighbor node table includes nodes existing within the range of the first hop from the source node. The forwarding table includes nodes existing within the range of the second hop from the source node. A direction of each node may be ascertained using the two tables.

Specifically, as an example, the neighbor node table may include three entries. The three entries may include a next zone, next node's identification (ID) and a position. The next zone includes information about a management area of a random node existing within the range of the first hop from the source node. The management area may refer to a GGC-based management area. The next node ID indicates a unique identifier of the random node. The position indicates location information of the random node. The location information may be acquired by using a global positioning system (GPS), a GGC, and the like. A value of each of the entries may be represented as a finite value or a null value depending on a type of the random node.

The forwarding table may include three entries. The three entries may be a forwarding zone, a direction, and a next node ID. The forwarding zone includes information about a management area of a random node existing within the range of the second hop from the source node. The management area may refer to a GGC-based management area. The next node ID indicates information about a node within the range of the first hop so that the source node moves to a node existing within the range of the second hop. Specifically, the node is located within the range of the first hop and provides information for configuring the next node ID. The direction may indicate a directional characteristic. When based on the source node, the direction refers to a direction of each nodes existing within the range of the second hop. As an example, the direction may be grouped into four directions. Also, the direction may be grouped by a different number of directions.

FIG. 2 is a diagram illustrating an example of a format of an update message broadcasted by a random node in a wireless network according to an exemplary embodiment of the present invention. Hereinafter, referring to FIG. 2, the format of the update message broadcasted by the random node for routing to configure a forwarding table described with reference to FIG. 1 is described.

As illustrated in FIG. 2, the update message may include information about the random node and information about a neighbor node within a range of a first hop. The information about the random node includes a node ID, a position and a coverage. The information about a neighbor node within the range of the first hop includes a neighbor node ID, a neighbor node position, and a neighbor node coverage. Specifically, the update message for routing according to an exemplary embodiment of the present invention includes location information about the random node, information about a GGC-based management area, and information about a neighbor node table of the random node. An initial update message is broadcasted before information about a neighbor node of the random node is accurately generated. Accordingly, entirely accurate information about the neighbor node may not be transmitted. However, currently generated information about the neighbor node may be accurate and broadcasted, and may be continuously broadcasted via a periodic transmission method. Particularly, a 'timestamp' area illustrated in FIG. 2 indicates a point in time when the update message is broadcasted, and may be used to check whether the information is recent information. When a great number of neighbor nodes around the random node exist, a size of the update message illustrated in FIG. 2 increases. The update message is broadcasted to the neighbor node and a broadcast period may be determined by a mobility of node in the wireless network.

Figure 3A:
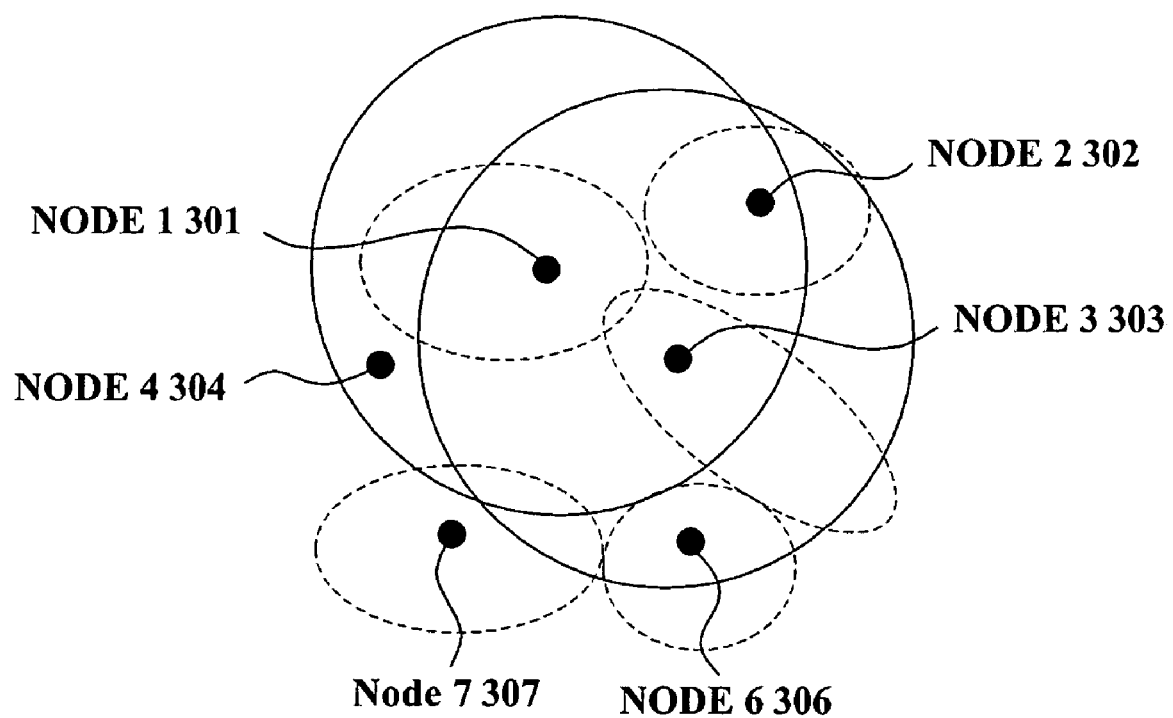
FIG. 3A is a diagram illustrating an example of a wireless network environment according to an exemplary embodiment of the present invention.

FIG. 3A is a diagram illustrating an example of a wireless network environment according to an exemplary embodiment of the present invention. FIG. 3B is a diagram illustrating an example of a neighbor node table of node 1 in the wireless network environment of FIG. 3A. FIG. 3C is a diagram illustrating an example of a neighbor node table of node 3 in the wireless network environment illustrated in FIG. 3A. Hereinafter, referring to FIG. 3A through 3C, an example of a neighbor node table is described.

For reference, in FIG. 3A, ovals represented in a dotted line refer to management areas managed by each node. Circles represented in a solid line refer to a transmission range of each node. As illustrated in FIG. 3A, node 2 302, node 3 303, and node 4 304 exist within a transmission range of a node 1 301. Node 2 302, node 3 303, and node 4 304 may be referred to as a first neighbor node located within a range of a first hop. Node 1 301, node 2 302, and node 6 306 exist within a transmission range of node 3 303.

The neighbor node table includes nodes located within a transmission range of a particular node. Accordingly, the neighbor node table of node 1 301 may be configured as illustrated in FIG. 3B, and the neighbor node table of node 3 303 may be configured as illustrated in FIG. 3C. An entry of FIGS. 3B and 3C is generated by receiving an update message illustrated in FIG. 2, and using information included in the received update message, for example, a neighbor node ID, a neighbor node position, a neighbor node coverage, and the like.

Figure 4A:
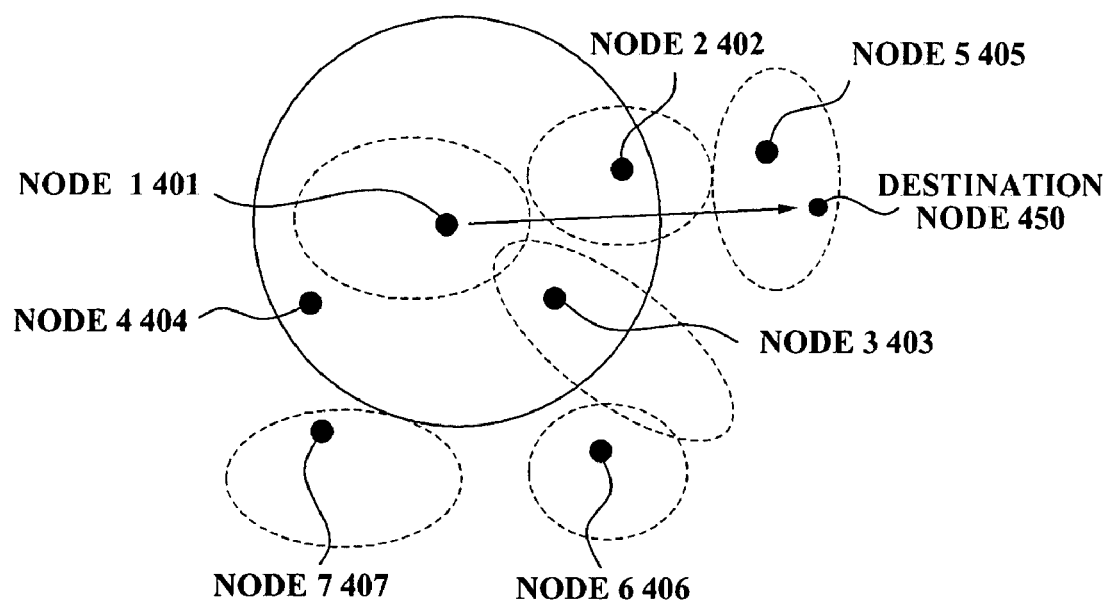
FIG. 4A is a diagram illustrating another example of a wireless network environment according to an exemplary embodiment of the present invention.

FIG. 4A is a diagram illustrating another example of a wireless network environment according to an exemplary embodiment of the present invention. FIG. 4B is a diagram illustrating an example of a format of an update message broadcasted by node 2 in the wireless network environment illustrated in FIG. 4A. FIG. 4C is a diagram illustrating an example of a forwarding table of node 1 in the wireless network environment illustrated in FIG. 4A. Hereinafter, referring to FIGS. 4A, 4B, and 4C, an example of the forwarding table is described.

For reference, in FIG. 4A, ovals represented by a dotted line refer to management areas managed by each node. Circles represented by a solid line refer to a transmission range of each node. A forwarding table illustrated in FIG. 4C may be configured via information of a neighbor node table of a neighboring node. Each node may acquire the information of the neighbor node table via an update message broadcasted by the neighboring node, for example, the message illustrated in FIG. 4B. The update message may be referred to as a regular update message.

As illustrated in FIG. 4A, an entry of a neighbor node table of node 1 401 includes information about node 2 402, node 3 403, and node 4 404. It is assumed that an entry of a neighbor node table of node 2 402 includes information about node 1 401, node 3 403, and node 5 405. Here, node 1 401 receives the neighbor node table of node 2 402 via the update message. The update message is broadcasted by node 2 402 and illustrated in FIG. 4B. In an exemplary implementation, node 1 401 determines whether a neighbor node included in the neighbor node table of node 1 401 matches a neighbor node included in the neighbor node table of node 2 402. As an example, in the wireless network environment configured as FIG. 4A, node 3 403 is overlapped in entries of both the neighbor node table of node 1 401 and the neighbor node table of node 2 402. Accordingly, node 1 401 does not generate node 3 403 in the forwarding table. Specifically, node 1 401 configures a forwarding table with respect to only second neighbor nodes. The second neighbor node is located within a range of a second hop. In FIG. 4A, node 5 405 may be the second neighbor node. Also, since node 2 402 transmits information about node 5 405 to node 1 401, node 2 402 is indexed as a next node ID corresponding to a 'Node 5 area' of the forwarding table illustrated in FIG. 4C.

Accordingly, when performing the above-described process with respect to the first neighbor node, that is, node 2 402, node 3 403, and node 4 404, the forwarding table including information about the second neighbor node, that is, node 5 405, node 6 406, and node 7 407, may be configured. The forwarding table including the information about the second neighbor nodes is illustrated in FIG. 4C. The first neighbor node is located within a range of a first hop from node 1 401, and the second neighbor node is located within a range of a second hop from node 1 401. An entry configuration about a direction is described later in the present specification.

An operation where each node discovers a destination node 450 using the forwarding table is described. As an example, when node 1 401 desires to retrieve the destination node 450 which manages a predetermined location, node 1 401 searches for a forwarding zone of the forwarding table illustrated in FIG. 4C, and thus may easily check the destination node 450 is node 5 405. Specifically, as a result of retrieving a management area including the destination node 450 in a forwarding zone entry of the forwarding table illustrated in FIG. 4C, node 1 401 may ascertain that the destination node 450 is included in the management area of node 5 405. Also, since a next node ID with respect to node 5 405 indicates node 2 402, node 1 401 may determine node 2 402 as the first hop.

A method of updating a neighbor node table is described. Information about the updating of the neighbor node table may be transmitted to neighboring nodes by broadcasting the update message illustrated in FIG. 2 or FIG. 4B. The broadcasting is periodically generated at a randomly set time at every node. Each node may maintain recent information by using a timestamp of the update message broadcasted by the neighbor node.

Figure 5:
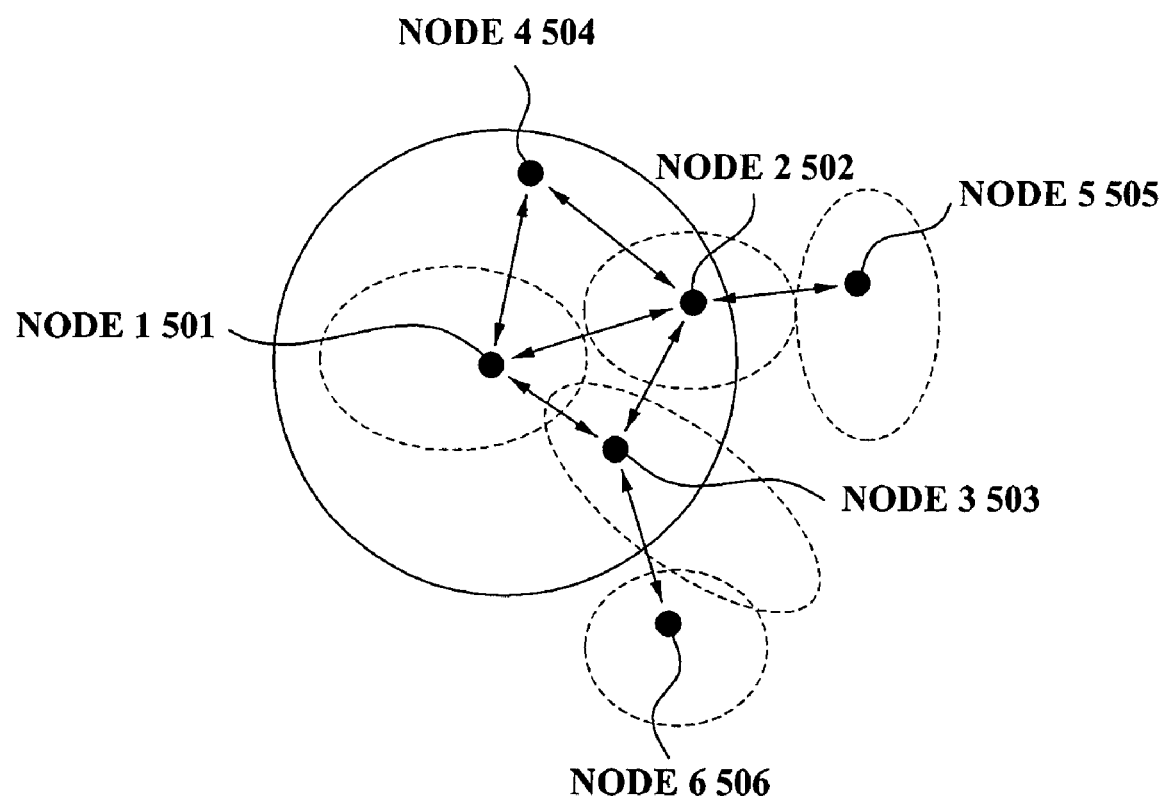
FIG. 5 is a diagram illustrating an example of updating a forwarding table in a wireless network environment according to an exemplary embodiment of the present invention.

FIG. 5 is a diagram illustrating an example of updating a forwarding table in a wireless network environment according to an exemplary embodiment of the present invention. Hereinafter, referring to FIG. 5, the method of updating the forwarding table is described.

The forwarding table is updated by using information about a neighbor node table transmitted via an update message of each node. The update message may be referred to as a regular update message. As illustrated in FIG. 5, node 1 501 uses information about node 5 505 to configure a forwarding table of node 1 501. Node 5 505 is located within a range of a first hop based on a node 2 502. Also, node 1 501 determines to which direction node 5 505 is located based on node 1 501 by using location information of node 1 501 and location information of node 5 505. A method of determining the direction is described later in the present specification.

A forwarding zone entry of the forwarding table is generated by using information about a management area of node 5 505. Node 2 502 transmitting information of node 5 505 is set as a next node ID.

Updating the forwarding table is performed every time the update message is received, and the forwarding table maintains recent information via a timestamp. When a node including a same management area in a forwarding table of the node exists including another next node, current information is updated to maintain recent information.

Figure 6:
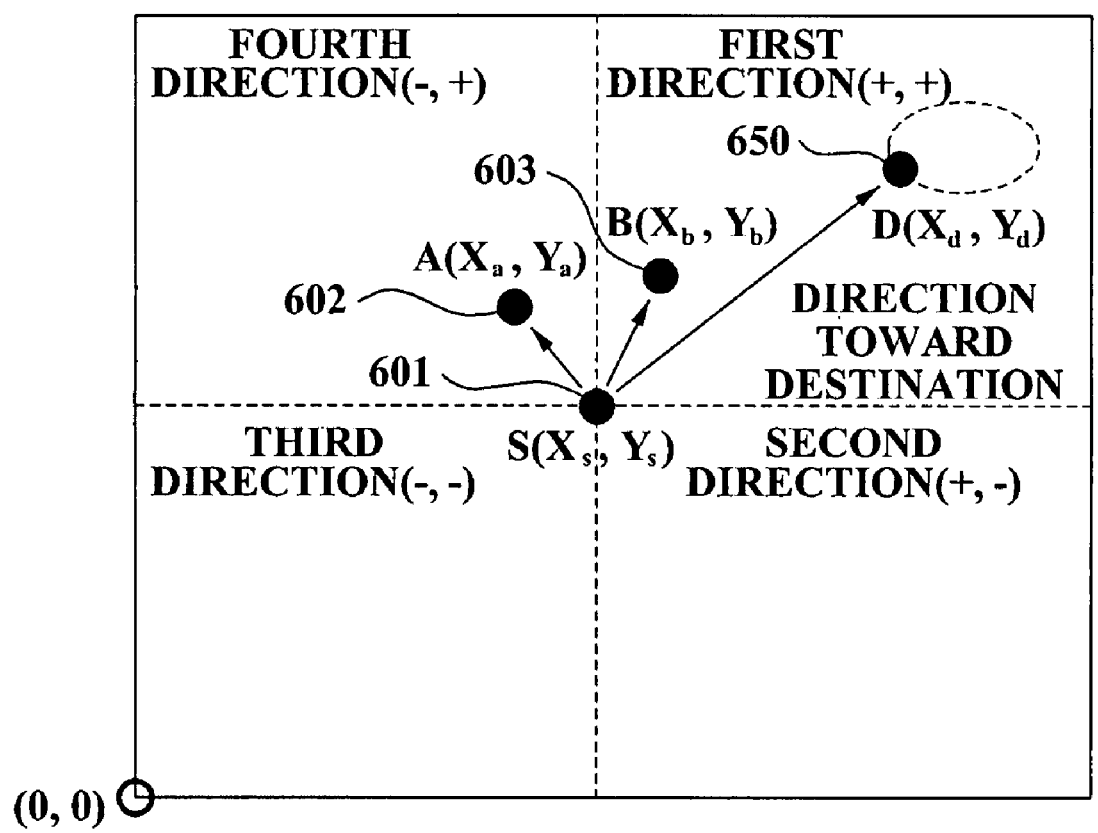
FIG. 6 is a diagram illustrating an example of determining a direction entry of a forwarding table in a wireless network environment according to an exemplary embodiment of the present invention.

FIG. 6 is a diagram illustrating an example of determining a direction entry of a forwarding table in a wireless network environment according to an exemplary embodiment of the present invention. Hereinafter, referring to FIG. 6, a method of establishing an optimal direction for an efficient route discovery is described.

All nodes including a source node 601 may determine a direction using location information of the source node 601 and location information of another node and a destination node. In exemplary embodiments of the present invention, a direction value is divided into four categories. Also, the direction value may be divided into a different number of categories. As illustrated in FIG. 6, all nodes have absolute location information of each node based on a coordinate of (0,0). As an example of determining the direction, a method of determining the direction by determining whether a result is a negative number or a positive number exists. The result refers to a value obtained when subtracting a location information value of the source node 601 from a location information value of a random node. The location information value may be represented as (x,y) form. Specifically, as illustrated in FIG. 6, when the result is (+, +), the direction is set as a first direction. When the result is (+, −), the direction is set as a second direction. When the result is (−, −), the direction is set as a third direction. When the result is (−, +), the direction is set as a fourth direction. As an example, a result of a direction between the source node 601 and node B 603 is (+, +), node B 603 is determined to be located in the first direction based on the source node 601. Also, a result of a direction between the source node 601 and node A 602 is (−, +), node A 602 is determined to be located in the fourth direction based on the source node 601. Accordingly, by using the result, the source node 601 may easily ascertain where the random node is located.

Figure 7A:
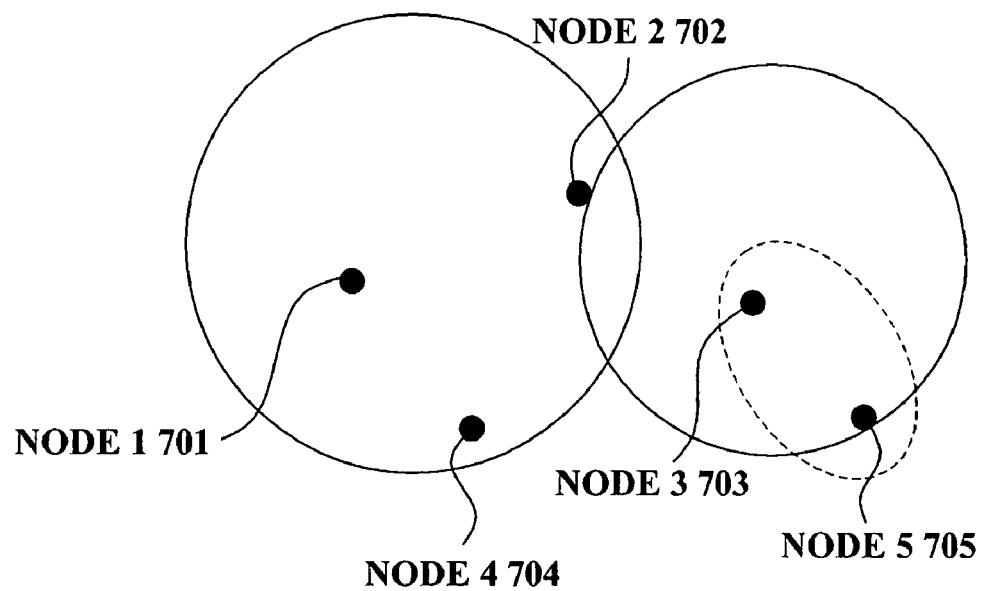
FIG. 7A is a diagram illustrating still another example of a wireless network environment according to an exemplary embodiment of the present invention.

FIG. 7A is a diagram illustrating still another example of a wireless network environment according to an exemplary embodiment of the present invention. FIG. 7B is a diagram illustrating an example of a neighbor node table of node 2 in the wireless network environment illustrated in FIG. 7A. Hereinafter, referring to FIGS. 7A and 7B, a method of enabling location-less nodes having no location information to join the wireless network environment is described.

In an exemplary embodiment of the present invention, a method of establishing virtual location information in the location-less nodes having no location information to enable the location-less node having no location information to receive a position-based service is provided. The method may be referred to as a position proxy function. The method of establishing a virtual location according to an exemplary embodiment of the present invention establishes location information of a node as location information of the location-less node having no location information. The node includes location information and is physically located closest to the location-less node having no location information from among neighboring nodes. In an exemplary implementation, a physical distance measurement may be determined according to a comparison of a signal-to-noise ratio (SNR) value with the neighboring nodes. As an example, when the SNR value is great, a node may be determined to be close to the location-less node having no location information. Also, when the SNR value is small, the node may be determined to be far from the location-less node having no location information.

As an example, it is assumed that node 3 703 is a relay node having no location information in the wireless network environment illustrated in FIG. 7A. Node 3 703 may collect information about the neighboring nodes via an update message. As described above, as a result of comparing the SNR value, when node 5 705 is the closest node, node 3 703 may set location information of node 5 705 as location information of node 3 703. Accordingly, as illustrated in FIG. 7B, node 3 703 uses the location information of node 5 705 for the location information of node 3 703. Thus, a random node which has no location information such as the relay node may join a position based routing.

FIG. 8 is a flowchart illustrating an example of a method of controlling an apparatus for establishing a path in a wireless network according to an exemplary embodiment of the present invention. Hereinafter, referring to FIG. 8, the method of controlling an apparatus for establishing a path in a wireless network is described.

In operation S800, a random node, for example, a source node, receives a route request (RREQ) message including location information of a destination node. In operation S801, the source node receiving the RREQ message determines whether the destination node may be directly managed when considering a management area of the source node. In operation S805, when the destination node may be directly managed as a result of the determining in operation S801, the source node drops the RREQ message.

In operation S802, when the destination node may not be directly managed as the result of the determining in operation S801, the source node determines whether a node which may manage the destination node exists in a neighbor node table. In operation S803, when the node which may manage the destination node does not exist in the neighbor node table as a result of the determining in operation S802, the source node determines whether the node which may manage the destination node exists in a forwarding table.

In operation S806, when the node which may manage the destination node exists in the forwarding table as the result of the determining in operation S803, the source node transmits the RREQ message to the existing node. In operation S804, when the node which may manage the destination node does not exist in the forwarding table as the result of the determining in operation S803, the source node determines whether nodes having a same direction as the destination node exist in the forwarding table.

In operation S806, when the nodes having the same direction as the destination node exist in the forwarding table as a result of the determining in operation S804, the source node transmits the RREQ message to the existing nodes. In operation S805, when the nodes having the same direction as the destination node does not exist in the forwarding table as a result of the determining in operation S804, the source node drops the RREQ message.

Figure 9A:
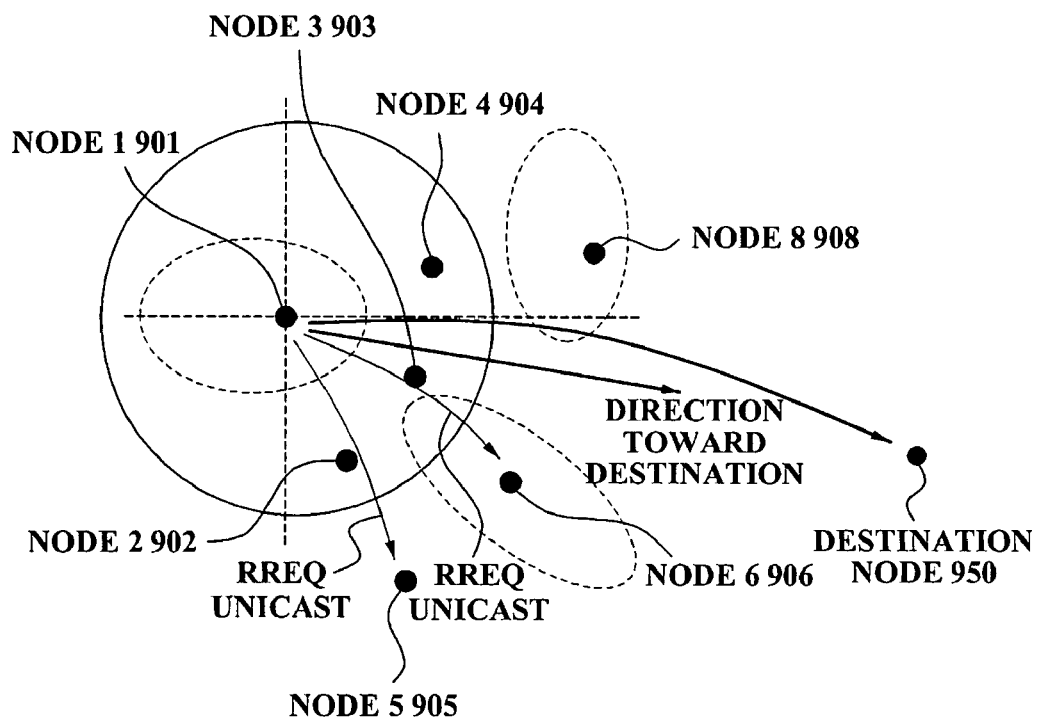
FIG. 9A is a diagram illustrating yet another example of a wireless network environment according to an exemplary embodiment of the present invention.

FIG. 9A is a diagram illustrating yet another example of a wireless network environment according to an exemplary embodiment of the present invention. FIG. 9B is a diagram illustrating an example of a forwarding table of node 1 in the wireless network environment of FIG. 9A. Hereinafter, referring to FIGS. 9A and 9B, a route discovery process is described.

A source node according to an exemplary embodiment of the present invention discovers a path using location information of a destination node 950, and the like. As a routing method, a combined method of a proactive method and a reactive method may be used. The proactive method periodically updates a table which is provided by all nodes. As a route discovery process using the table, a route request/route reply (RREQ/RREP) message may be used.

Specifically, a direction of a point where the destination node 950 is located, based on a location of the source node, is determined using the above-described methods. It is determined that a node which manages the destination node 950 exists in a neighbor node table of the source node, based on the determined direction. As a result of the determining, when the node exists, data is directly transmitted to the node. For example, when directly transmitted, a unicast method may be used, and the route discovery process is unnecessary.

Conversely, when the node does not exist, a node having a same direction as the determined direction is retrieved in a forwarding table. A RREQ message is transmitted to only the retrieved node using a multicast method or the unicast method.

As an example, in the wireless network environment illustrated in FIG. 9A, a forwarding table of node 1 901 may be configured as illustrated in FIG. 9B. However, node 1 901 may be the source node. As illustrated in FIG. 9A, since a node managing the destination node 950 does not exist among a first neighbor node, a second neighbor node is retrieved. The first neighbor node is located within a range of a first hop from node 1 901. The second neighbor node is located within a range of a second hop from node 1 901 and has a same direction as the direction where the destination node 950 is located. Referring to FIGS. 9A and 9B, the second neighbor node may be node 5 905 and node 6 906.

Accordingly, node 1 901 does not transmit the RREQ message to node 8 908, and limits transmission of the RREQ message to node 5 905 and node 6 906. Thus, an overhead of route discovery is reduced, and efficiency may be improved. Also, the above described process is repeated until the RREQ message is received in the destination node 950. The destination node 950 may transmit the RREP message with respect to only a RREQ message which arrives first.

Figure 10:
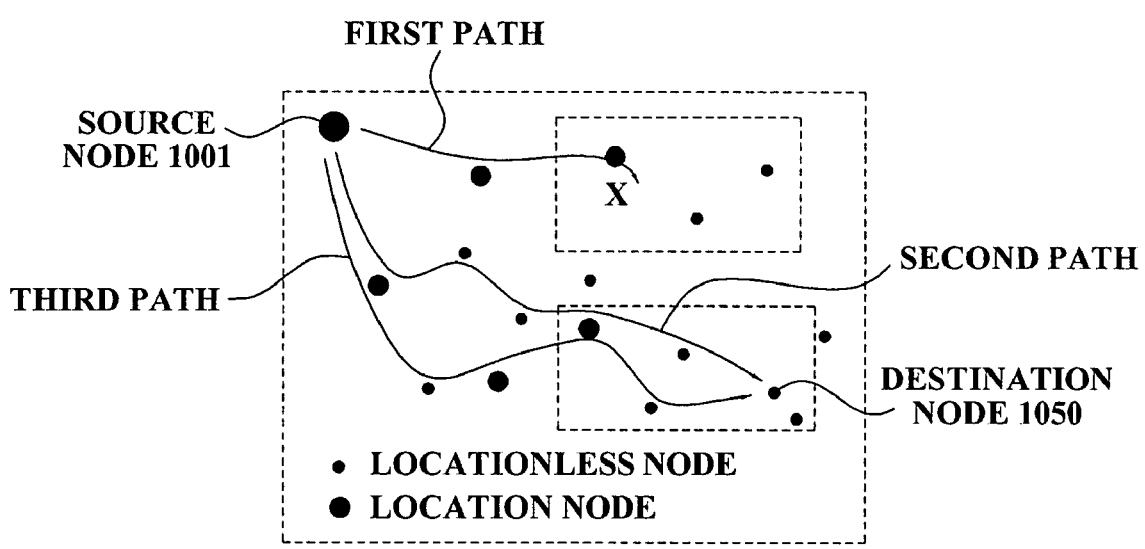
FIG. 10 is a diagram illustrating an example of a wireless network environment including a location node having location information and a location-less node having no location information according to an exemplary embodiment of the present invention.

FIG. 10 is a diagram illustrating an example of a wireless network environment including a location node having location information and a location-less node having no location information according to an exemplary embodiment of the present invention. Hereinafter, referring to FIG. 10, a route discovery process in the wireless network environment including the location node and the location-less node is described.

As illustrated in FIG. 10, a source node 1001 first determines a direction of a destination node 1050. Nodes having a same direction as the determined direction are selected in a forwarding table, and a RREQ message is forwarded to the selected nodes. A second neighbor node receiving the RREQ message determines a direction based on the second neighbor node by using location information of the destination node 1050 in the RREQ message. Another second neighbor node, which may be performed as a relay node, is retrieved in a forwarding table of the second neighbor node by using the determined direction, and the RREQ message is transmitted to the retrieved second neighbor node. The above described process is repeated until the RREQ message is transmitted to a node managing the destination node 1050.

As illustrated in FIG. 10, when the location-less node exists in the wireless network environment according to an exemplary embodiment of the present invention, a position proxy function described above may be used to join a routing.

As a result of the repeated process, a second path and a third path may be considered as a path between the destination node 1050 and the source node 1001. However, in a case of the first path, it may be checked that a path to the destination node 1050 does not exist using the forwarding table. Specifically, since the node having a direction to the destination node 1050 does not exist in the forwarding table, it may be checked that the path to the destination node 1050 does not exist. Thus, a disadvantage in a conventional art, specifically, it is not recognized that the path does not exist and the RREQ message is unnecessarily transmitted to all nodes using a condition with respect to a request range between the source node and the destination node, may be overcome according to an exemplary embodiment of the present invention. According to an exemplary embodiment of the present invention, an unnecessary RREQ message transmission may be prevented, a routing overhead may be reduced, and a data transmission efficiency may be improved.

When the RREQ message is transmitted to the node managing a range including the destination node 1050, the transmitting of the RREQ message is stopped. The destination node 1050 finally receiving the RREQ message may select a path having a least number of hops from among a plurality of RREQ messages. Also, a particular path may be selected depending on a purpose predetermined by a network administrator, for example, an energy-aware path selection, and the like.

Figure 11:
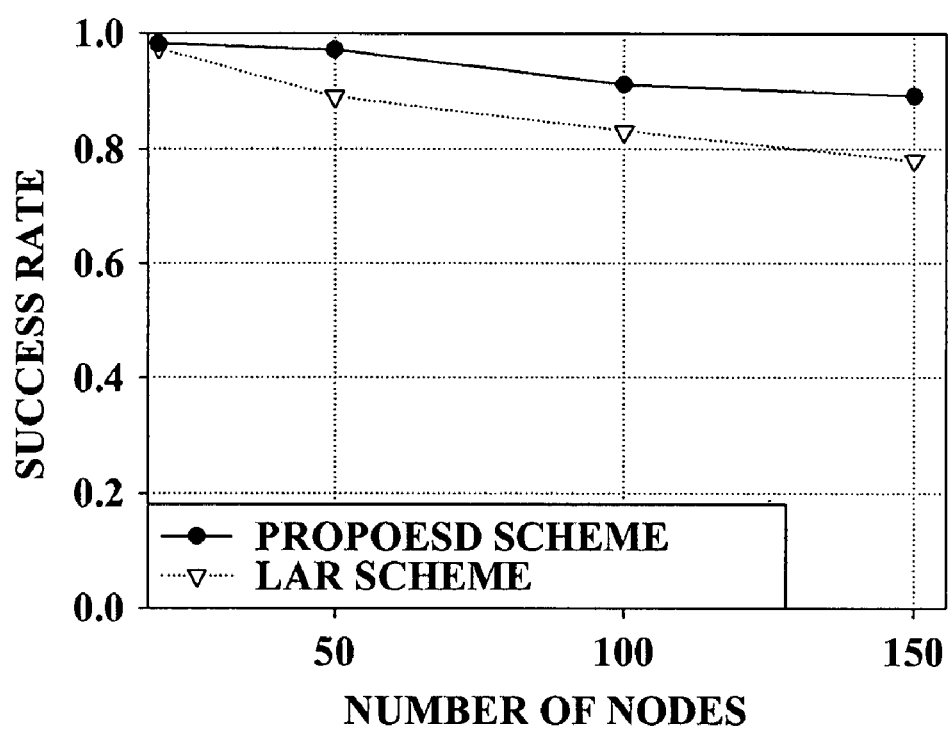
FIG. 11 is a graph illustrating a first effect of a method and apparatus for establishing a path in a wireless network according to an exemplary embodiment of the present invention.
Figure 12:
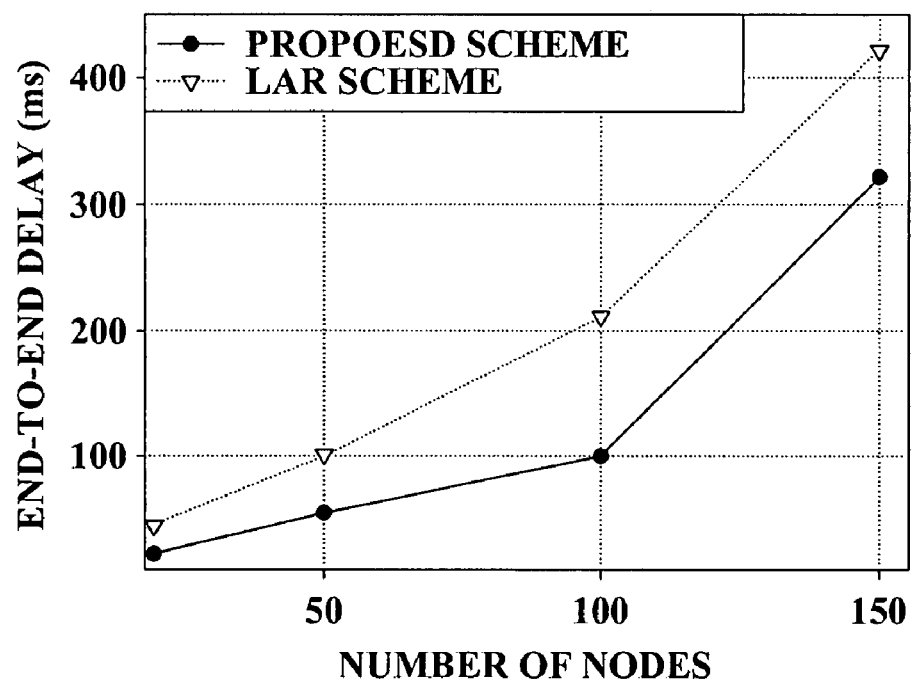
FIG. 12 is a graph illustrating a second effect of a method and apparatus for establishing a path in a wireless network according to an exemplary embodiment of the present invention.

FIG. 11 is a graph illustrating a first effect of a method and apparatus for establishing a path in a wireless network according to an exemplary embodiment of the present invention. FIG. 12 is a graph illustrating a second effect of a method and apparatus for establishing a path in a wireless network according to an exemplary embodiment of the present invention. Hereinafter, referring to FIGS. 11 and 12, an improved scalability of exemplary embodiments of the present invention in comparison to a conventional art is described.

To prove a specific effect of exemplary embodiments of the present invention, for example, a window-based simulator may be used. A graph where a proposed scheme according to an exemplary embodiment of the present invention and a location-aided routing (LAR) scheme are compared is illustrated. As an experimental environment, a number of nodes are changed in a random area, for example, 500 m×500 m. A source node and a sink node are randomly selected, and a number of route requests are, for example, 100.

FIG. 11 illustrates a change of a success rate according to the number of nodes. FIG. 12 illustrates a change of an end-to-end delay according to the number of nodes. As illustrated in FIGS. 11 and 12, a result of the scalability according to an exemplary embodiment of the present invention is greatly improved in comparison to the LAR scheme in the conventional art, since an overhead required for a route discovery, for example, a RREQ message, a RREP message, and the like, is reduced and a link bandwidth may be efficiently used. Specifically, a high success rate with respect to a route request and a low end-to-end delay result may be obtained.

Figure 13:
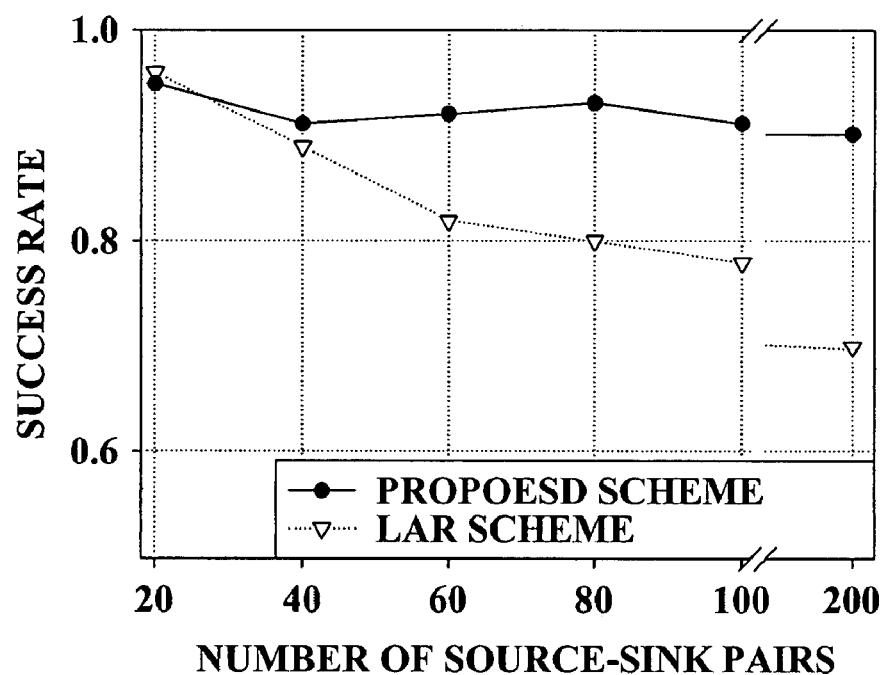
FIG. 13 is a graph illustrating a third effect of a method and apparatus for establishing a path in a wireless network according to an exemplary embodiment of the present invention.
Figure 14:
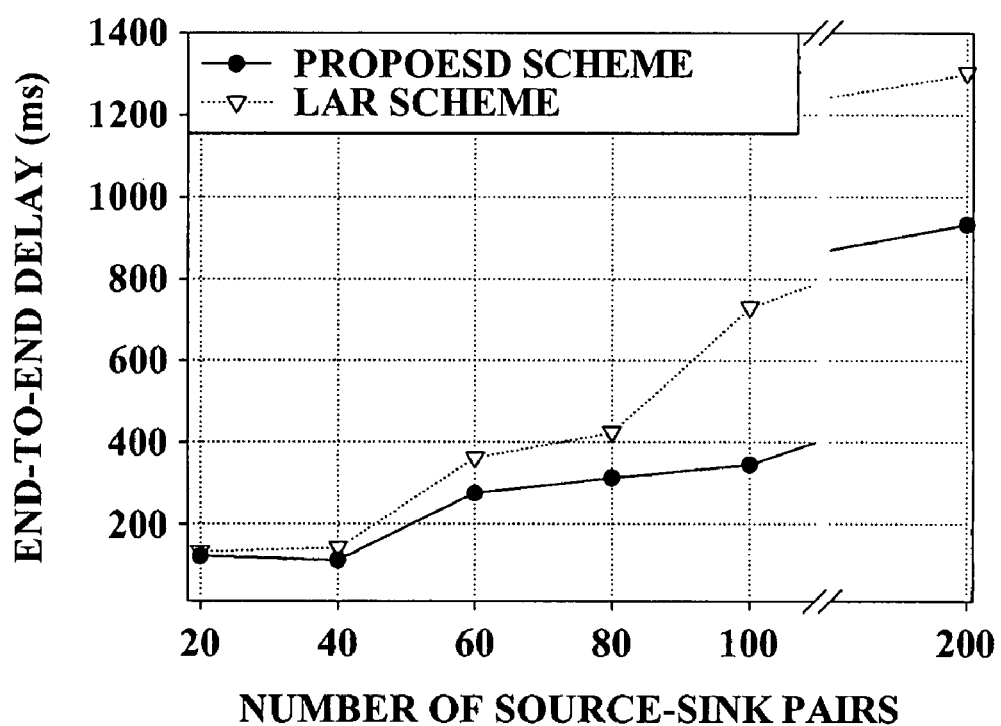
FIG. 14 is a graph illustrating a fourth effect of a method and apparatus for establishing a path in a wireless network according to an exemplary embodiment of the present invention.

FIG. 13 is a graph illustrating a third effect of a method and apparatus for establishing a path in a wireless network according to an exemplary embodiment of the present invention. FIG. 14 is a graph illustrating a fourth effect of a method and apparatus for establishing a path in a wireless network according to an exemplary embodiment of the present invention. Hereinafter, referring to FIGS. 13 and 14, an effect due to a change of a route request which is improved in comparison to a conventional art is described.

As an example, a number of a source-sink pairs is changed in 150 numbers of nodes in a random area, for example, 500 m×500 m. A source node and a sink node are randomly selected. An experiment is performed five times and an average result of the five experiments is illustrated in FIGS. 13 and 14. As illustrated in FIGS. 13 and 14, a scheme according to an exemplary embodiment of the present invention is improved in comparison to a LAR scheme in the conventional art, since an routing overhead, for example, a RREQ message, a RREP message, and the like, due to an increase in the number of source-sink pairs is reduced and a link bandwidth may be efficiently used. Specifically, a high success rate with respect to a route request and a low end-to-end delay result may be obtained.

Figure 15A:
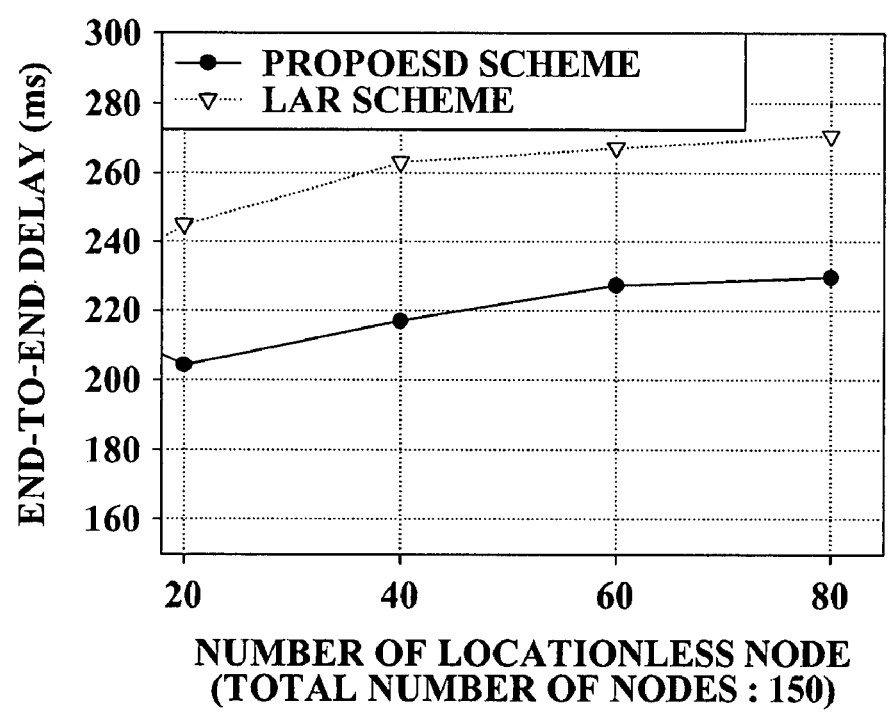
FIG. 15A is a graph illustrating a fifth effect of a method and apparatus for establishing a path in a wireless network according to an exemplary embodiment of the present invention.
Figure 15B:
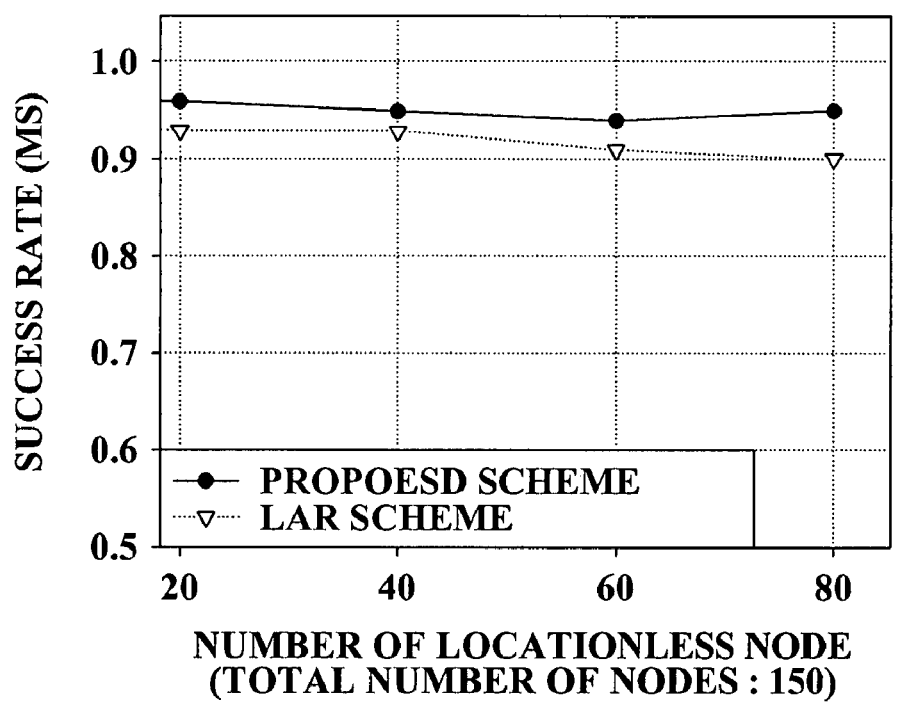
FIG. 15B is a graph illustrating a sixth effect of a method and apparatus for establishing a path in a wireless network according to an exemplary embodiment of the present invention.
Figure 15C:
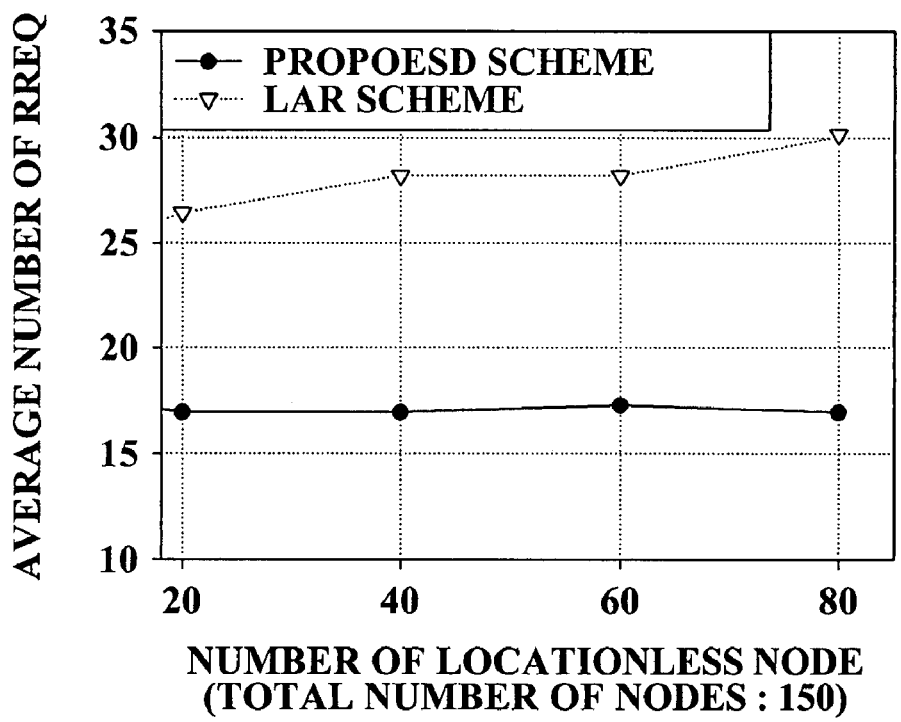
FIG. 15C is a graph illustrating a seventh effect of a method and apparatus for establishing a path in a wireless network according to an exemplary embodiment of the present invention.

FIG. 15A is a graph illustrating a fifth effect of a method and apparatus for establishing a path in a wireless network according to an exemplary embodiment of the present invention. FIG. 15B is a graph illustrating a sixth effect of a method and apparatus for establishing a path in a wireless network according to an exemplary embodiment of the present invention. FIG. 15C is a graph illustrating a seventh effect of a method and apparatus for establishing a path in a wireless network according to an exemplary embodiment of the present invention. Hereinafter, a position proxy function according to an exemplary embodiment of the present invention which is improved in comparison to a conventional art is described.

As an example, performance estimation is performed in a wireless network including a location node and a location-less node in a random area, for example, 500 m×500 m. A location node includes location information, and a location-less node does not include location information. A total number of nodes are fixed as 150, and a number of location-less nodes are changed. A source node and a sink node are randomly selected, and a number of route requests are, for example, 100.

As a result of the experiment, exemplary embodiments of the present invention show an improvement in terms of an end-to-end delay, a success rate of the route request, an average number of RREQ in comparison to the LAR scheme in the conventional art as illustrated in FIGS. 15A, 15B, and 15C. Specifically, according to an exemplary embodiment of the present invention, although a number of the location-less nodes increases, the success rate of the route request maintains at least 0.95. Also, the average number of RREQ is maintained as approximately 17. However, in the conventional art, as a number of the location-less nodes increases, the success rate of the route request decreases, and the average number of RREQ increases.

According to exemplary embodiments of the present invention, there is provided a method and apparatus for establishing a path in a wireless network where a flooding method is limitedly used for nodes, located in a same direction as a destination node, as opposed to all nodes included in the wireless network, and thus an overhead may be reduced and an efficiency may be improved during a route discovery process.

Also, according to exemplary embodiments of the present invention, there is provided a method and apparatus for establishing a path in a wireless network which may use location-less nodes having no location information during a route discovery process in a wireless network environment, when a great number of location-less nodes having no location information exist.

The above-described exemplary embodiments of a method and apparatus path for establishing a path in a wireless network may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, et and so on, including a carrier wave transmitting signals specifying the program instructions, data structures, et and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While the exemplary embodiments of the present invention have been shown and described with reference to certain illustrative embodiments thereof, it will be understood by those skilled in the art that various changes in form and details may be made therein without departing from the spirit and scope of the present invention as defined by the appended claims and their equivalents.

What is claimed is:

1. A method of establishing a path in a wireless network, the method comprising:
    receiving, by a receiving unit, location information about one or more first neighbor nodes and one or more second neighbor nodes including at least one location-less node having virtual location information;
    determining, by a determination unit, at least one second neighbor node which is located within a range of one hop from at least one first neighbor node, based on the location of a source node and the received location information, wherein the determined at least one second neighbor node is not the source node or one of the first neighbor nodes;
    determining, by a determination unit, a direction of a point where the determined at least one second neighbor node is located, based on the location of the source node and the received location information;
    detecting, by a detection unit, a particular second neighbor node, from among the at least one second neighbor nodes, having a location that is in the same direction of a point where a destination node is located, based on the source node; and
    limitedly establishing, by an establishment unit, a path via the detected particular second neighbor node, when the source node establishes a path for transmitting predetermined data to the destination node,
    wherein the virtual location information is determined by extracting a signal-to-noise ratio (SNR) value of one or more second neighbor nodes, determining the closest second neighbor node to the location-less node based on the extracted SNR value, and setting the virtual location information of the location-less node to be the same as the location information of the closest second neighbor node.

2. The method of claim 1, wherein the wireless network comprises an ad hoc network.

3. The method of claim 1, wherein the location information includes at least one of Global Positioning System (GPS) information and GeoGraphic Code (GGC) information.

4. The method of claim 1, wherein the direction is divided into four directions depending on whether a difference of each of an X value and a Y value is a positive number or a negative number, the X value and the Y value indicating points of two nodes.

5. The method of claim 1, wherein the limitedly establishing comprises:
    selecting a path having a least number of hops, when at least two detected second neighbor nodes exist.

6. The method of claim 1, wherein each of the one or more first neighbor nodes are located within a range of one hop from the source node, and each of the one or more second neighbor nodes are located within a range of a two hops from the source node.

7. An apparatus for establishing a path in a wireless network, the apparatus comprising:
    a receiving unit for receiving location information about one or more first neighbor nodes and one or more second neighbor nodes including at least one location-less node having virtual location information;
    a determination unit for determining at least one second neighbor node which is located within a range of one hop from at least one first neighbor node, based on the location of a source node and the received location information, wherein the determined at least one second neighbor node is not the source node or one of the first neighbor nodes, and for determining a direction of a point where the determined at least one second neighbor node is located, based on the location of a source node and the received location information;
    a detection unit for detecting a particular second neighbor node, from the at least one of the one or more second neighbor nodes, having a same direction of a point where a destination node is located, based on the source node; and
    an establishment unit for limitedly establishing a path via the detected particular second neighbor node, when the source node establishes a path for transmitting predetermined data to the destination node,
    wherein the determination unit determines the virtual location information by extracting a signal-to-noise ratio (SNR) value of one or more second neighbor nodes, determining the closest second neighbor node to the location-less node based on the extracted SNR value, and setting the virtual location information of the location-less node to be the same as the location information of the closest second neighbor node.

8. The apparatus of claim 7, wherein the wireless network comprises an ad hoc network.

9. The apparatus of claim 7, wherein the location information includes at least one of GPS information and GGC information.

10. The apparatus of claim 7, wherein the direction is divided into four directions depending on whether a difference of each of an X value and a Y value is a positive number or a negative number, the X value and the Y value indicating points of two nodes.

11. The apparatus of claim 7, wherein each of the one or more first neighbor nodes are located within a range of one hop from the source node, and each of the one or more second neighbor nodes are located within a range of two hops from the source node.

12. A method of a node for establishing a path in a wireless network, the method comprising:
    receiving location information about one or more first neighbor nodes and one or more second neighbor nodes;

configuring a forwarding table including the received location information about one or more first neighbor nodes and one or more second neighbor nodes;

determining location information of a destination node does not exist in the forwarding table;

determining at least one second neighbor node which is located within a range of one hop from at least one first neighbor node, based on the location of a source node and the received location information, wherein the determined at least one second neighbor node is not the source node or one of the first neighbor nodes;

determining a direction of a point where the at least one second neighbor node is located, based on the location of a source node and the received location information;

detecting a particular second neighbor node, from among the at least one second neighbor nodes, having a location that is in the same direction as the destination node, based on the source node; and limitedly establishing a path via the detected particular second neighbor node, towards the destination node.

* * * * *